United States Patent
Geilenkirchen et al.

(10) Patent No.: US 6,195,833 B1
(45) Date of Patent: *Mar. 6, 2001

(54) WIPER BLADE

(75) Inventors: Robert Geilenkirchen, Fleron; Eric Impens, Bertem, both of (BE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/811,374

(22) Filed: Mar. 4, 1997

(30) Foreign Application Priority Data

Apr. 19, 1996 (DE) ............................. 196 15 421

(51) Int. Cl.$^7$ ........................................ B60S 1/38
(52) U.S. Cl. ............................ 15/250.48; 525/215
(58) Field of Search ............... 15/250.48, 250.361, 15/245; 428/492; 525/215

(56) References Cited

U.S. PATENT DOCUMENTS

| | | | |
|---|---|---|---|
| 2,952,865 | * 9/1960 | Rohr et al. | 15/250.48 |
| 2,975,459 | * 3/1961 | Wojciechowski et al. | 15/250.48 |
| 3,116,506 | * 1/1964 | Browne et al. | 15/250.48 |
| 4,616,060 | * 10/1986 | Killgoar | 15/250.48 |
| 4,622,712 | * 11/1986 | Sugita et al. | 15/250.48 |
| 4,658,463 | * 4/1987 | Sugita et al. | 15/250.48 |
| 4,669,144 | * 6/1987 | Yasukawa et al. | 15/250.48 |
| 4,853,428 | * 8/1989 | Theodore et al. | 15/250.48 |

FOREIGN PATENT DOCUMENTS

| | | | |
|---|---|---|---|
| 35 27 093C2 | 12/1989 | (DE) . | |
| 625452A1 | 5/1994 | (EP) . | |
| 61-105257 | * 5/1986 | (JP) | 15/250.48 |
| 62-279155 | * 12/1987 | (JP) | 15/250.48 |

* cited by examiner

Primary Examiner—Gary K. Graham
(74) Attorney, Agent, or Firm—Kenyon & Kenyon

(57) ABSTRACT

A wiper blade has a wiper head for mounting a wiper bracket, a wiper lip, and a tilting web connecting the wiper head with the wiper lip, the wiper head and the tilting web being composed of a material selected from the group consisting of polychloroprene and a polymer mixture including portion of at least 60 weight percent polychloroprene and at least one another elastomere, the wiper lip at least in a part which comes in contact with a glass pane being composed of a material selected from the group consisting of natural rubber and a synthetic elastomere based on a diene with hydrocarbon structure.

13 Claims, 1 Drawing Sheet

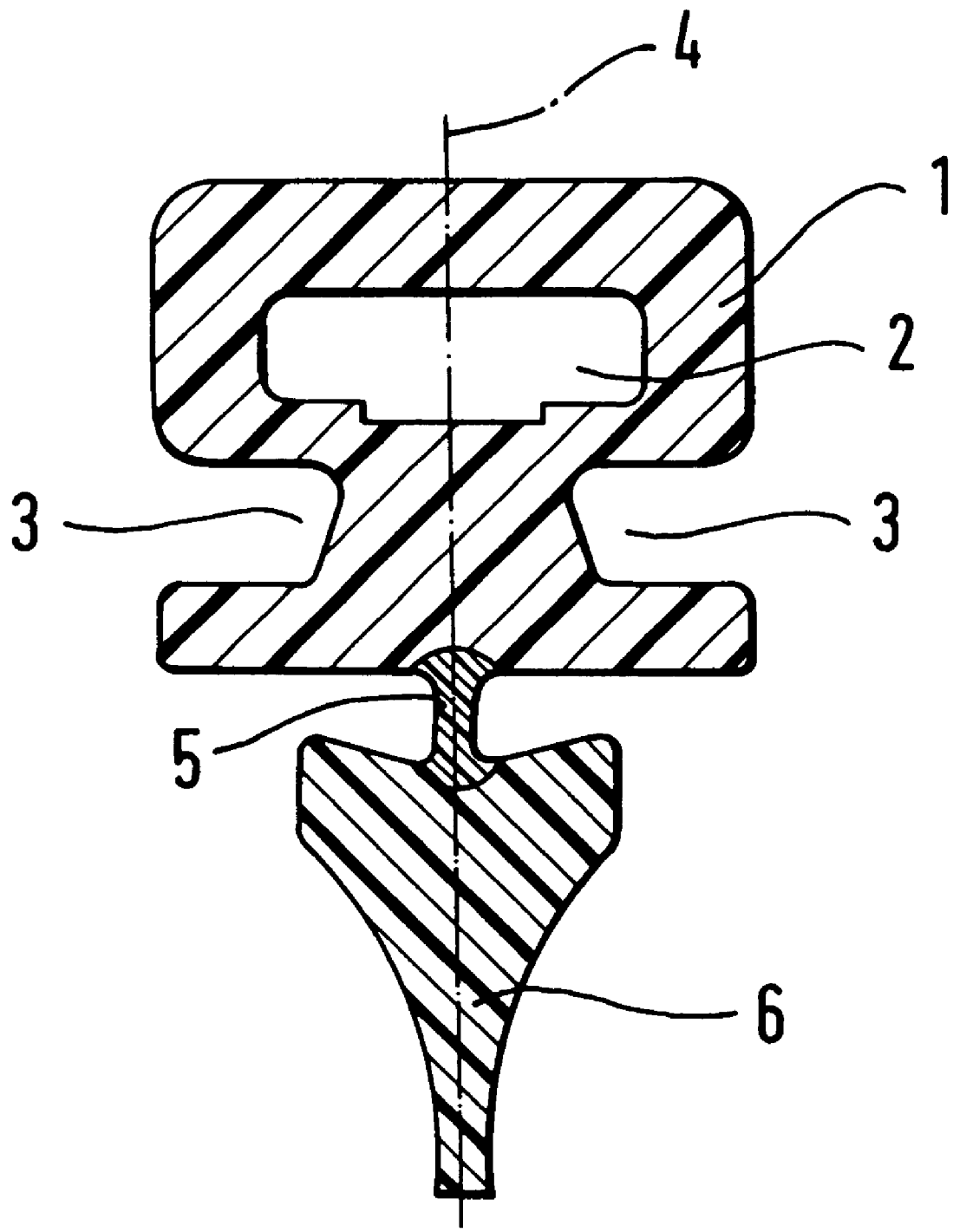

WIPER BLADE

BACKGROUND OF THE INVENTION

The present invention relates generally to wiper blades for motor vehicles and air vehicles.

Wiper blades of the above mentioned type are subjected to high mechanical loads by dust, insect residues, or other hard dirt components which make the glass surface to be cleaned rough. On the other hand, they are subjected to mechanical loads by the tilting which always alternates during the wiping process in its direction, and in the movable condition because of the pressure against the glass pane. In addition to the mechanical loads, also chemical actions or environmental actions affect the wiper blades, for example ozone, oil as well as alcohol and/or detergents in the window washing fluid.

Wiper blades are produced as a rule continuously by extrusion or coextrusion of cross-linked polymers or polymer mixtures. The extruded strands are cross-linked to elastomeric profiles and cut into the required length. The wiper blades have a wiper head (also known as a base part or a back), with which the wiper blade is mounted in a bracket system of the window wipers. Holes or recesses are provided in the wiper blade for one or several spring rails of an elastic metal, which stabilize the wiper blade and must provide a maximum uniform pressure over the total length of the wiper blade.

At the side facing the glass pane the wiper head has a tilting web which is known as a neck, a hinge or a web. The wiper head is connected with a wiper lip which during operation of the window wiper acts as a functional part of the wiper blade which holds the glass pane free from water. The tilting web is the part of the wiper blade which is mechanically loaded the most. Depending on its height and design of the opposite surfaces of the wiper head and the wiper lip, the wiper lip in the movable condition can deviate with its main transverse axis (identified in the drawing with reference numeral 4) by up to 45° from the perpendicular to the glass pane. In the operational condition the lip runs behind the head, whereby during each directional change a tilting movement is required. The main transverse axis changes correspondingly its position during the operation by up to substantially ±-45°.

The wiper lips on the one hand can be adjusted to the geometry of at least curved glass pane or in other words must be flexible. On the other hand they have to be sufficiently hard to provide mechanical removal of dirt particles deposited on the glass pane. Finally, they must be wear-resistant, so that over a long time they provide high cleaning quality without forming stripes.

Wiper blades in accordance with the prior art have all parts composed of a single elastomeric material. This is very convenient for manufacture. However, this does not take into consideration different requirements for different parts of the wiper blades. When for example the material is relatively soft and highly elastic, it satisfies important requirements with respect to the tilting web. However, it suits very little for the head, since during the operation not seldom it turns out of the claws which hold the wiper blade in the metal bracket. When the material to the contrary is harder and less elastic, it is well suitable for the head, but less suitable for the mechanical loads to which the tilting web is constantly subjected.

Wiper blades only from one material, namely natural rubber or a mixture of natural rubber and chloroprene rubber or a rubber of diene type, butadiene, butadiene rubber and styrol-butadiene rubber are disclosed for example in the German patent document DE-C2 35 27 093. Natural rubber and other rubbers of diene type contain olefin double bindings and are sensitive to ozone. By treatment with a hypochlorite (chlorinating) the surface of the wiper blade is hardened. This is advantageous for the wiper lip whose wear resistance is increased. However, a compromise has to be maintained when a complete chlorination of the surface is performed to provide wear resistance, since it makes the surface of the lip less flexible so that it does not sufficiently adjust to the glass pane. For a tilting web of natural rubber and/or other rubbers of diene type the chlorination is damaging since it provides a permanent deformation under the action of pressure. Such an action is applied to the wiper blade in a movable condition and in operation since it is continuously pressed against the glass pane.

The wiper pane in accordance with the invention disclosed in the German patent document DE-C2 35 27 093 is composed substantially only of one material, namely EPDM rubber, a mixed polymer of ethylene, propylene and diene which is cross-linked with peroxides and is resistant against ozone. The wiper blade at the lower end of the lip which faces the glass pane and in the upper peripheral zones of the head has small segments of secondary quantity of diene rubber. EPDM has a high friction coefficient which makes difficult insertion in particular of the inwardly located spring strips and makes necessary a surface coating of the springs strips or the use of the sliding-assisting means such as molybdenum sulfide.

Wiper blades of different, coextruded materials are known, in which in contrast to the German patent document DE-C2 35 27 093 the different materials are provided in comparable quantities. In the European patent document EP-A1 0 625 452 a wiper blade is disclosed which is composed at least of two different materials. In one described embodiment the head and the tilting web are composed of the same material, while a lip which is composed of a different material surrounds a reinforcement in which the small tilting web runs. This embodiment have the above mentioned disadvantage that the material is not completely right for different requirements applied to the head and to the web.

SUMMARY OF THE INVENTION

Accordingly, it is an object of present invention to provide a wiper blade which avoids the disadvantages of the prior art.

In keeping with these objects and with others which will become apparent hereinafter, one feature of the present invention resides, briefly stated, in a wiper blade in which the wiper head and the tilting web are composed of polychloroprene or a polymer mixture of a portion of at least 60 weight percent polychloroprene and at least another elastomere, while the wiper lip is composed, at least in the parts which contact with the glass pane, of natural rubber and/or a synthetic elastomere based on a diene with hydrocarbon structure.

When the wiper blade is designed in accordance with the present invention, it has a combination of advantageous properties so that disadvantages of the known wiper blades are eliminated. It is insensitive in all its parts to ozone and also to environmental factors and chemicals which practically occur for corresponding usage. The wiper head is so hard that it is not turned out from its holder. The material of the wiper head is sufficiently smoothed, so that also the inwardly located spring strips can be easily inserted. The tilting web is high elastic and exceptionally copes with the mechanical loads in a movable condition and in operational condition. Also, it exhibits no plastic deformation after chlorination. The wiper lip is composed, at least in its decisive functional part, of an elastomere which is hardened on its surface by chlorination and therefore better resists wear.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing a wiper blade in accordance with the present invention.

DESCRIPTION OF PREFERRED EMBODIMENTS

A wiper blade in accordance with the present invention has a wiper head which is identified as a whole with reference numeral 1. The wiper head 1 has a hollow 2, in which a not shown spring strip of metal or synthetic plastic material is inserted. The wiper head 1 further has a recess 3 in which not shown holding claws of a wiper bracket engage. The hollow 2 does not constitute an important feature of the present invention. For example instead of one central hollow 2, for an inwardly located spring strip two further recesses can be provided at the right side and the left side of the main cross-sectional axis 4 for receiving the outwardly located spring strips.

The wiper blade further has a tilting web which is identified with reference numeral 5. It further has a wiper lip identified with reference numeral 6. The tilting web 5 connects the wiper head 1 with the lip 6.

In accordance with the present invention the wiper head 1 and the tilting web 5 are composed of a predetermined, identical material, while the wiper lip 6 is composed, at least in its operational parts, of another elastomere.

The wiper head 1 and the tilting web 5 are composed of polychloroprene or a polymer mixture including a portion of at least 60, preferably 80 weight percent of polychloroprene and at least another elastomere. The above mentioned other elastomere is preferably polymer based on dienes with hydrocarbon structure, such as natural rubber, synthetic polybutadiene and polyisoprene, as well as copolymers of dienes with functional monomeres, such as styrole, acrylonitrile, vinylesters and acrylomonomers. For example, butadiene-styrole copolymer and butadieneacrylonitrile are utilized.

The wiper lip 6 is composed, at least in portions which are in contact with the glass pane, of another material than the wiper head 1 and the tilting web 5. Namely, its composed of natural rubber and/or a synthetic elastomere based on a diene of hydrocarbon structure. Preferably, the wiper lip 6 is composed as a whole of this other material. In addition to rubber, also other material can use for this purpose, in particular the above mentioned polymers based on dienes with hydrocarbon structure, which together with chloroprene can form the material for the wiper head 1 and the tilting web 5. Additionally, also polychloroprenes can be utilized.

The wiper blades in accordance with the present invention can be produced by coextruding and cross-linking of the corresponding polymers or polymer mixtures in a known manner. The strands of a desired length can be cut. The polymers and polymer mixtures can contain admixtures which are conventional for cross-linked mixtures, such as sulfur, thiuramdisulfide, peroxide, such as dicumylproxide, as well as soot, zink oxide and other fillers.

The wiper blades in accordance with the present invention can be chlorinated, preferably for hardening of the parts which are in contact with the glass pane in a known manner.

It will be understood that each of the elements described above, or two or more together, may also find a useful application in other types of constructions differing from the types described above.

While the invention has been illustrated and described as embodied in wiper blade, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A wiper blade, comprising a wiper head for mounting a wiper bracket; a wiper lip; and a tilting web connecting said wiper head with said wiper lip, said wiper head and said tilting web being composed of a same material, said wiper lip being composed of another material than said wiper head and said tilting web, said wiper head and said tilting web being composed of a polymer mixture including a proportion of at least 60 weight percent polychloroprene and at least another elastomere, said wiper lip being composed completely of a material selected from the group consisting of natural rubber and a synthetic elastomere based on a diene with hydrocarbon structure.

2. A wiper blade as defined in claim 1, wherein the polymer mixture of which the wiper head and the tilting web are composed includes a proportion of at least 80 weight percent polychloroprene and at least another elastomer.

3. A wiper blade as defined in claim 1, wherein the wiper head, the wiper lip, and the tilting web are chlorinated.

4. A wiper blade comprising:

a wiper head for mounting a wiper bracket;

a wiper lip; and a tilting web connecting the wiper head with the wiper lip; wherein the wiper head and the tilting web are each composed of a first material and the wiper lip is composed of a second material, wherein the first material is a mixture of two elastomers and comprises 60 percent or more by weight polychloroprene (CR), and wherein the second material is natural rubber or a synthetic elastomer based on a diene with hydrocarbon structure.

5. The wiper blade of claim 4 wherein the first material comprises 80 percent by weight or more polychloroprene.

6. The wiper blade of claim 4 wherein the first material comprises 95 percent by weight or more polychloroprene.

7. The wiper blade of claim 4 wherein at least the second material is hardened by chlorination.

8. The wiper blade of claim 7 wherein the first and second materials are hardened by chlorination.

9. A wiper blade comprising:

a wiper head for mounting a wiper bracket;

a wiper lip; and a tilting web connecting the wiper head with the wiper lip; wherein the wiper head and the tilting web are each composed of a first material and the wiper lip is composed of a second material, wherein the first material is a mixture of two elastomers and comprises 60 percent or more by weight polychloroprene (CR), and wherein the second material is selected from the group consisting of natural rubber (NR), synthetic polyisoprene (IR), polybutadiene rubber (BR), styrene-butadiene rubber (SBR), and butadiene acrylonitrille rubber (NBR).

10. The wiper blade of claim 9 wherein the first material comprises 60 percent by weight or more polychloroprene.

11. The wiper blade of claim 9 wherein the first material comprises 95 percent by weight or more polychloroprene.

12. The wiper blade of claim 9 wherein at least the second material is hardened by chlorination.

13. The wiper blade of claim 9 wherein the first and second materials are hardened by chlorination.

* * * * *